United States Patent
Yin et al.

(10) Patent No.: US 9,985,685 B2
(45) Date of Patent: May 29, 2018

(54) POWER SPECTRUM DENSITY OPTIMIZATION

(71) Applicant: Futurewei Technologies, Inc., Plano, TX (US)

(72) Inventors: Hui Yin, Shenzhen (CN); Zhong Pan, Guangdong (CN); Jianping Tu, Shenzhen (CN); Haixiang Liang, Atherton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 59 days.

(21) Appl. No.: 14/861,467

(22) Filed: Sep. 22, 2015

(65) Prior Publication Data
US 2016/0094273 A1    Mar. 31, 2016

Related U.S. Application Data

(60) Provisional application No. 62/056,309, filed on Sep. 26, 2014.

(51) Int. Cl.
*H04B 3/32* (2006.01)
*H04B 3/487* (2015.01)
*H04B 3/50* (2006.01)

(52) U.S. Cl.
CPC ............. *H04B 3/32* (2013.01); *H04B 3/487* (2015.01); *H04B 3/50* (2013.01)

(58) Field of Classification Search
CPC .. H04B 3/32; H04B 3/487; H04B 3/50; H04J 1/12; H04J 3/10
See application file for complete search history.

(56) References Cited

U.S. PATENT DOCUMENTS

| | | | |
|---|---|---|---|
| 2009/0271550 A1 | 10/2009 | Clausen et al. | |
| 2010/0208785 A1* | 8/2010 | Lindqvist | H04B 3/32 375/227 |
| 2011/0007788 A1* | 1/2011 | Cendrillon | H04B 3/32 375/222 |

(Continued)

FOREIGN PATENT DOCUMENTS

CN    103229472 A    7/2013

OTHER PUBLICATIONS

Foreign Communication From a Counterpart Application, PCT Application No. PCT/CN2015/090557, International Search Report dated Dec. 31, 2015, 7 pages.

(Continued)

*Primary Examiner* — Lisa Hashem
(74) *Attorney, Agent, or Firm* — Conley Rose, P.C.

(57) ABSTRACT

A method comprising allocating one or more detection tones of a sync symbol for crosstalk-free feedback data estimation, wherein the one or more detection tones are a quiet signal; transmitting the one or more detection tones to a computing device, receiving the crosstalk-free feedback data from the computing device, wherein the crosstalk-free feedback data comprises data associated with a background noise detected during the detection tones; determining an optimized PSD based at least in part on the crosstalk-free feedback data; and adjusting a transmission PSD of a plurality of tones based at least in part on the optimized PSD.

19 Claims, 10 Drawing Sheets

(56) References Cited

U.S. PATENT DOCUMENTS

| | | | | |
|---|---|---|---|---|
| 2011/0080937 | A1* | 4/2011 | Kim | H04L 5/0007 375/219 |
| 2012/0057716 | A1* | 3/2012 | Chang | G10K 11/178 381/71.1 |
| 2012/0219123 | A1* | 8/2012 | Berg | H04B 3/487 379/27.01 |
| 2013/0010931 | A1* | 1/2013 | Berg | H04B 3/487 379/22 |
| 2013/0022096 | A1* | 1/2013 | Kazmi | H04L 5/0048 375/224 |
| 2013/0121435 | A1 | 5/2013 | Chang et al. | |
| 2013/0142319 | A1* | 6/2013 | Lu | H04B 3/32 379/93.08 |
| 2013/0202002 | A1* | 8/2013 | Hung | H04J 3/0638 370/503 |
| 2014/0029406 | A1 | 1/2014 | Liang et al. | |
| 2014/0140187 | A1* | 5/2014 | Wang | H04B 3/32 370/201 |
| 2014/0219074 | A1* | 8/2014 | Lu | H04B 3/32 370/201 |
| 2014/0233724 | A1* | 8/2014 | Croot | H04B 3/32 379/406.08 |
| 2014/0307572 | A1* | 10/2014 | Mungall | H04J 3/025 370/252 |
| 2014/0307749 | A1* | 10/2014 | Liang | H04L 27/2601 370/509 |
| 2015/0071336 | A1* | 3/2015 | Kerpez | H04B 3/32 375/227 |
| 2016/0087677 | A1* | 3/2016 | Strobel | H04B 3/32 375/285 |
| 2017/0019149 | A1* | 1/2017 | Oksman | H04B 3/46 |
| 2017/0026521 | A1* | 1/2017 | Horsley | H04B 3/32 |
| 2017/0054473 | A1* | 2/2017 | Jochen | H04B 3/32 |
| 2017/0134069 | A1* | 5/2017 | Boban | H04B 3/487 |
| 2017/0279490 | A1* | 9/2017 | Maes | H04B 3/32 |
| 2017/0318150 | A1* | 11/2017 | Tsiaflakis | H04M 3/18 |
| 2018/0054235 | A1* | 2/2018 | Liang | H04M 11/062 |

OTHER PUBLICATIONS

Foreign Communication From a Counterpart Application, PCT Application No. PCT/CN2015/090557, Written Opinion dated Dec. 31, 2015, 4 pages.

"Self-FEXT Cancellation (Vectoring) for Use with VDSL2 Transceivers," Series G: Transmission Systems and Media, Digital Systems and Networks—Digital Sections and Digital Line System—Access Networks, ITU-T G.993.5, Apr. 2010, 80 pages.

"Self-FEXT Cancellation (Vectoring) for Use with VDSL2 Transceivers," Series G: Transmission Systems and Media, Digital Systems and Networks—Digital Sections and Digital Line System—Access Networks, ITU-T G.993.5 Corrigendum 1, Jun. 2011, 9 pages.

Machine Translation and Abstract of Chinese Publication No. CN103229472, Jan. 20, 2016, 10 pages.

Machine Translation and Abstract of International Publication No. WO2014101202, Part 1, Jul. 3, 2014, 8 pages.

Machine Translation and Abstract of International Publication No. WO2014101202, Part 2, Jul. 3, 2014, 3 pages.

\* cited by examiner

POWER SPECTRUM DENSITY OPTIMIZATION

CROSS-REFERENCE TO RELATED APPLICATIONS

The present application claims priority to U.S. Provisional Patent Application No. 62/056,309 filed Sep. 26, 2014, by Hui Yin, et al., and entitled "Method and System for PSD Optimization Protocol to Improve DSL System Performance," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide a large bandwidth for digital communications over existing subscriber lines. When transmitting data over the subscriber lines, crosstalk interference can occur between the transmitted signals over adjacent twisted-pair phone lines, for example in a same or nearby bundle of lines. Crosstalk, including near-end crosstalk (NEXT) and far-end crosstalk (FEXT), may limit the performance of various DSL systems such as those defined by standards including asymmetric DSL 2 (ADSL2), very high speed DSL 2 (VDSL2), and G.fast (future standard). In use, crosstalk can be reduced or canceled by joint processing of signals in multiple subscriber lines. Depending on whether the signals are in a downstream or upstream direction, a crosstalk precoder or canceller may be used on an operator's end of a DSL system, such as a digital subscriber line access multiplexer (DSLAM). For example, crosstalk precoding is a technique in which downstream signals are pre-distorted prior to transmission through a binder. A pre-distortion filter or 'precoding matrix' is used to pre-distort the signals, and thus cancel FEXT that occurs between subscriber lines in the binder. The signals may then arrive at receivers located at different customer sites with less or no FEXT.

SUMMARY

In one embodiment, the disclosure includes an apparatus comprising a processor configured to define one or more detection tones in a sync symbol for crosstalk-free feedback data estimation, wherein the one or more detection tones are a quiet signal; a transmitter operably coupled to the processor and configured to transmit the detection tones to a computing device; and a receiver operably coupled to the processor and configured to receive the crosstalk-free feedback data from the computing device, wherein the crosstalk-free feedback data comprises data associated with a background noise detected during the detection tones, wherein the processor is further configured to estimate an optimized power spectrum density (PSD) for a plurality of tones based at least in part on the crosstalk-free feedback data.

In another embodiment, the disclosure includes an apparatus comprising a receiver configured to receive one or more detection tones of a sync symbol for crosstalk-free feedback data estimation from a computing device, wherein the one or more detection tones are a quiet signal, a processor operably coupled to the receiver and configured to measure the crosstalk-free feedback data, wherein the crosstalk-free feedback data comprises data associated with a background noise detected during the detection tones; and a transmitter operably coupled to the processor and configured to transmit the crosstalk-free feedback data to the computing device, wherein the computing device is configured to estimate an optimized PSD based on the crosstalk-free feedback data.

In yet another embodiment, the disclosure includes a method comprising allocating one or more detection tones of a sync symbol for crosstalk-free feedback data estimation, wherein the one or more detection tones are a quiet signal; transmitting the one or more detection tones to a computing device, receiving the crosstalk-free feedback data from the computing device, wherein the crosstalk-free feedback data comprises data associated with a background noise detected during the detection tones; determining an optimized PSD based at least in part on the crosstalk-free feedback data; and adjusting a transmission PSD of a plurality of tones based at least in part on the optimized PSD.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
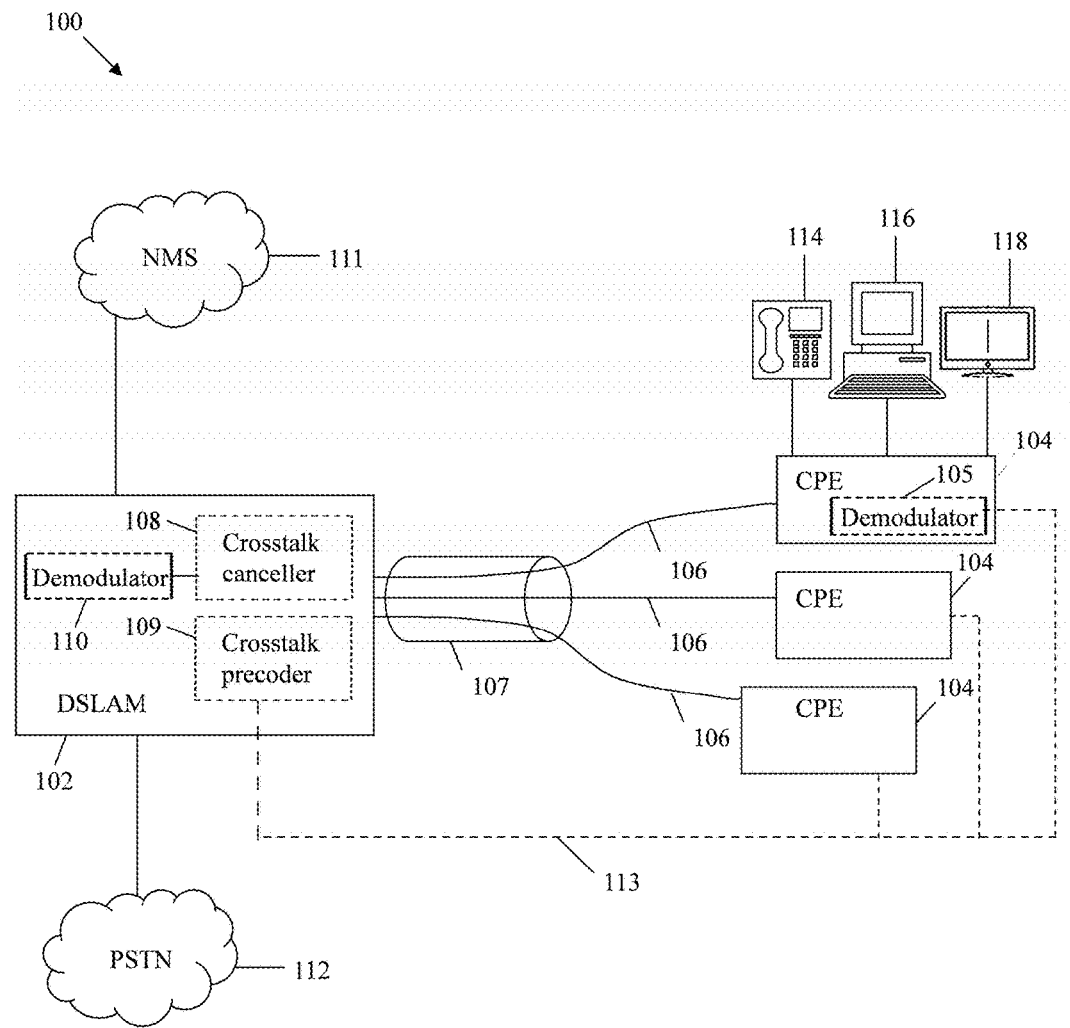
FIG. 1 is a schematic diagram of an embodiment of a DSL system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for optimizing a PSD (sometimes referred to herein as power spectral density) to improve DSL performance. PSD may refer to a power utilized to transmit one or more tones. According to some embodiments, a system for PSD optimization may include a transmitter and a receiver. The transmitter may be configured to define one or more detection tones on one or more sync symbols to be transmitted to a receiver. The one or more detection tones may correspond to a quiet signal. In addition, the transmitter may be configured to transmit data regarding an initial PSD to the receiver with the detection tones.

In some embodiments, the receiver may be configured to measure a background noise present on the detection tones. Because only a quiet signal is sent on the detection tone, signals from the original subscriber line and crosstalk from a join line may not be present on the detection tones. In this way, the background noise measured during the detection tones may be crosstalk-free background noise (sometimes referred to as background noise). In one embodiment, the receiver may also be configured to generate feedback data regarding the crosstalk-free background noise. For example, the receiver may be configured to estimate a value of the background noise and then measure the crosstalk-free signal-to-noise ratio (SNR).

According to some embodiments, the transmitter may receive the feedback data regarding the background noise from the receiver. The transmitter may be configured to utilize the feedback data to optimize the PSD early in a training phase of an initialization process. For example, the feedback data may be used to estimate an accurate PSD for each tone (also sometimes referred to herein as subcarrier). In one embodiment, once an optimized PSD is estimated for each tone, the transmitter may adjust the PSD for each tone to be the optimized PSD. For example, the optimized PSD may be the same or substantially similar to the initial PSD calculated by the receiver. Therefore, in one embodiment, the transmitter may be configured to adjust the PSD to be the same or substantially similar to the initial PSD calculated by the receiver. Thus, the feedback data may be used to facilitate adjusting the PSD for each tone to optimize the data throughput. Adjusting the PSD, or power levels, by which signals are sent on each tone may optimize and stabilize DSL system performance, resulting in a higher rate capacity while saving power.

FIG. 1 illustrates a schematic diagram of an embodiment of a DSL system 100, in which disclosed FEXT estimation schemes may be implemented. The DSL system 100 may be a VDSL2 system, an ADSL2 system, an ADSL2+ system, or any other DSL system (e.g., systems to be defined in the International Telecommunication Union Standardization Sector (ITU-T) G.fast standard). VDSL2, ADSL2, ADSL2+, and G.fast systems are defined in ITU-T G.993.2, G.992.3, G.992.4, G.992.5, and G.9701, which are each incorporated herein in their entirety by this reference. The DSL system 100 may comprise a DSLAM 102 and a plurality of customer premise equipments (CPEs) 104, which may be coupled to the DSLAM 102 via a plurality of subscriber lines 106. The DSLAM 102 may be located on an operator end of the DSL system 100, such as a central office (CO), an exchange, a distribution center, or a cabinet. The CPEs 104 may be located on a remote or subscriber end. At least some of the subscriber lines 106 may be bundled in a binder 107. In an embodiment, the DSLAM 102 comprises a crosstalk canceller 108, which may be configured to reduce or cancel upstream FEXT, and a crosstalk precoder (or vector precoder) 109, which may be configured to reduce or cancel downstream FEXT. The crosstalk canceller 108 may be coupled to a demodulator 110, which may comprise a frequency domain equalizer (FEQ) and a constellation decoder. In estimation of upstream FEXT channels, the demodulator 110 may be configured to generate error signals based on an upstream signal, which is induced by upstream FEXT. The crosstalk precoder 109 may pre-distort downstream signals, which are then transmitted downstream to the CPEs 104 via the subscriber lines 106.

Each of the CPEs 104 may comprise a demodulator 105, which may be configured to equalize the downstream signals and generate an error signal comprising error vectors. The demodulator 105 may be coupled to the crosstalk precoder 109 via a plurality of feedback channels 113. Feedback symbols comprising the error signal may be transmitted from a CPE 104 to the DSLAM 102. The feedback channels 113 (shown in dotted lines) may correspond to upstream logical data paths from the CPEs 104 to the DSLAM 102 and may not be physically separated from the subscriber lines 106 (shown in solid lines). The CPEs 104 may transmit the error feedback signals in the feedback channels 113 through the subscriber lines 106 to a plurality of corresponding receivers in the DSLAM 102, which may then extract the error signals from the upstream data stream. Additionally, the DSLAM 102 may optionally comprise a network management system (NMS) 111 and a public switched telephone network (PSTN) 112. The NMS 111 may be a network management infrastructure that processes data exchanged with the DSLAM 102 and may be coupled to one or more broadband networks, such as the Internet. The PSTN 112 may be a network that generates, processes, and receives voice or other voice-band signals.

The crosstalk precoder 109 may be configured to reduce or limit the crosstalk in the lines. The crosstalk precoder 109 may transmit pre-distorted downstream signals in the subscriber lines 106 to cancel or reduce crosstalk error in the lines. The crosstalk precoder 109 may process a plurality of downstream signals from a transmitter in the DSLAM 102, add distortion to the downstream signals, and transmit the pre-distorted downstream signals to the CPEs 104 via the subscriber lines 106. The pre-distorted signals may be generated by the crosstalk precoder 109 whose parameters are properly chosen to minimize the crosstalk in the downstream channels. In order for the crosstalk precoder 109 to select the appropriate parameters, the CPEs 104 may send back the error signals in the downstream receivers as feedback for the crosstalk precoder 109 to estimate downstream crosstalk and update its parameters. For instance, a plurality of transceivers at the CPEs 104 may measure the errors for a plurality of received symbols (e.g., DMT symbols) from the crosstalk precoder 109, and transmit back to the DSLAM 102 a plurality of corresponding error feedback signals, via the feedback channel 113. The feedback channel 113 may be established through upstream data signal paths from the CPEs 104 to the DSLAM 102, which may be provided in addition to upstream communications data.

In other embodiments, the DSLAM 102 may be modified to include splitters, filters, management entities, and various other hardware, software, and functionality. For example, the DSLAM 102 may comprise switches and/or splitters, which may couple the NMS 111, the PSTN 112, and the subscriber lines 106. For instance, the splitter may be a 2:1 coupler that forwards data signals received from the subscriber lines 106 to the NMS 111 and the PSTN 112, and forwards data signals received from the NMS 111 and the PSTN 112 to the subscriber lines 106. Further, the splitter may optionally comprise one or more filters to help direct data signals between the NMS 111, the PSTN 112, and the subscriber lines 106. Additionally, the DSLAM 102 may comprise at least one DSL transmitter/receiver (transceiver), each of which is referred to as an xTU-C. The xTU-C (e.g., a master modem) may exchange signals between the NMS 111, the PSTN 112, and the subscriber lines 106.

In an embodiment, the CPEs 104 may be located at the customer premises, where at least some of the CPEs 104 may be coupled to a telephone 114, a computer 116, and/or a television 118. The telephone 114 may be hardware, software, firmware, or combinations thereof that generates, processes, and receives voice or other voice-band signals. The CPE 104 may comprise a switch and/or a splitter, which may couple the subscriber lines 106 and the telephone 114, the computer 116, and the television 118.

Depending on the supported standard, the DSL system 100 may be referred to as an xDSL system, where 'x' may indicate any DSL standard. For instance, 'x' stands for 'A' in ADSL2 or ADSL2+ systems, and 'x' stands for 'V' in VDSL or VDSL2 systems. When a transceiver in the DSL system 100 is located in a CO, the transceiver may be referred to as an xTU-C. In practice, as long as the transceiver is located at an operator end of the loop (including a CO, exchange, or cabinet), it may be referred to as an xTU-C. On the other hand, when a transceiver in the DSL system 100 is located at a remote or user end such as a customer premise, the transceiver may be referred to as an xTU-R. For example, if the DSL system 100 is a VDSL2 system, a CO transceiver may then be referred to as a VDSL2 transceiver unit (VTU) at an optical network unit (VTU-O). Sometimes, a VTU-O may also be referred to as a VTU at a central office (VTU-C). Similarly, in the VDSL2 system, a CPE transceiver may be referred to as a VTU at a remote terminal (VTU-R).

The process of sending the pilot symbols (e.g., to the VTU-Rs) and receiving corresponding error feedback signals (at the VTU-Os) may be repeated over a period of time to improve the output of the crosstalk canceller 108 and hence improve crosstalk cancellation. Such period of time may be referred to as the training or initialization time of the crosstalk canceller 108. For instance, during the initialization time, a sequence of pilot symbols may be transmitted and accordingly a sequence of error feedback signals may be received (e.g., for each subscriber line 106) until the pre-distorted signals from the crosstalk canceller 108 converge to a pattern or value.

Figure 2:
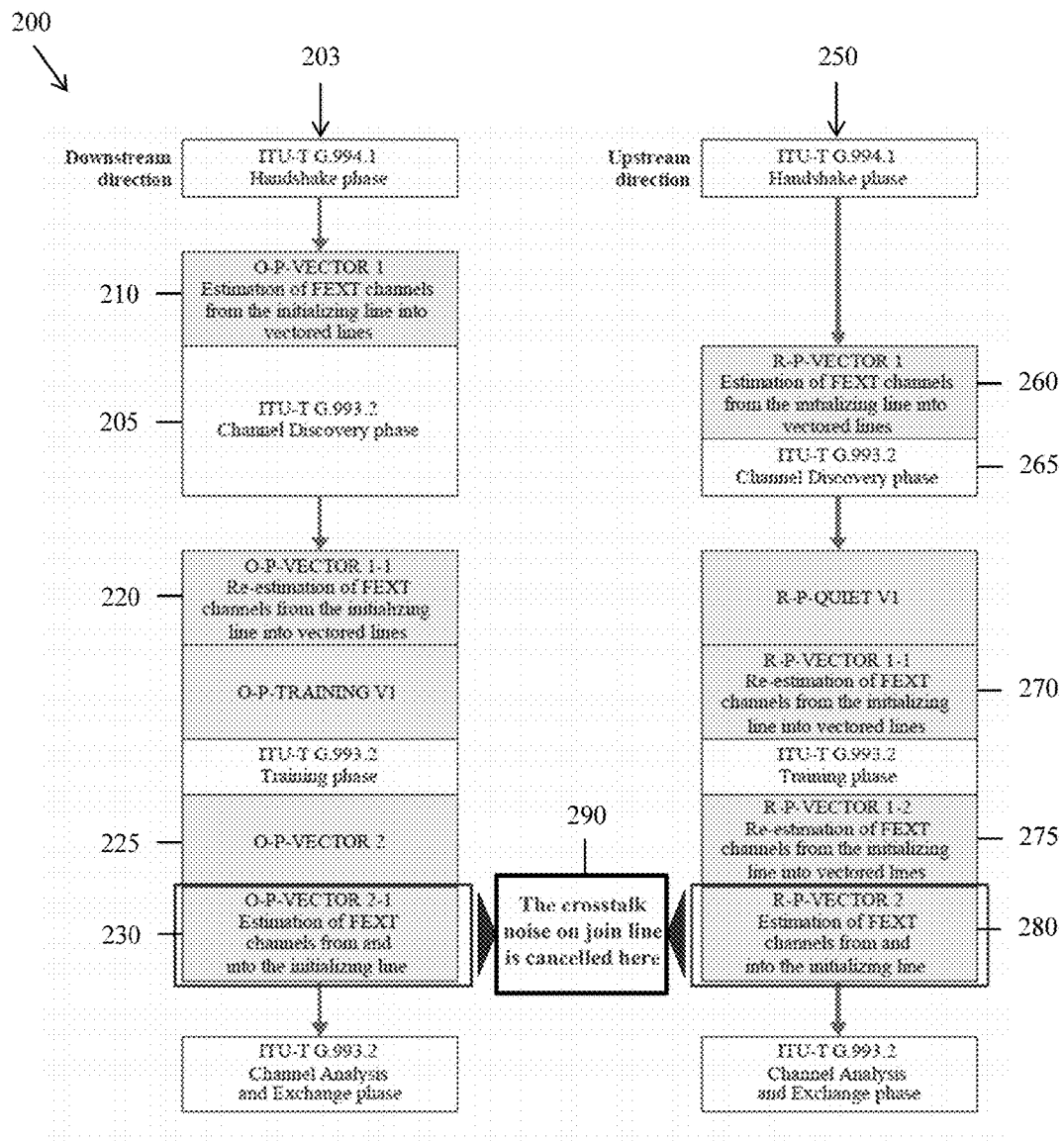
FIG. 2 is an illustration of an example initialization procedure used by the embodiment of the DSL system of FIG. 1.

FIG. 2 is a flow diagram illustrating an overview of the ITU-T G.993.5 initialization procedure for when a join line is introduced into a DSL system (e.g., the DSL system 100 of FIG. 1) according to standard protocols for both the upstream and downstream directions. ITU-T G.993.5 standard, entitled "Self-FEXT cancellation (vectoring) for use with VDSL2 transceivers," is incorporated herein in its entirety by this reference. Since crosstalk may occur between any of the present lines in a DSL system (e.g., the DSL system 100 of FIG. 1), the disturber line may be a showtime or join line, and the victim line may also be a showtime or join line. Typically, initialization of a DSL modem begins with several discrete phases, including: handshake, training, channel analysis, and showtime. The outcome of initialization is a contract between the modems on communication parameters which takes into account both modem capabilities and limitations in the quality of the communication medium linking the modems. During the handshake phase each modem passes to the other basic identity information such as: inverse or discrete Fourier transform size and the initial length of the cyclic extension. The handshake procedure is further described in ITU-T G.994.1 standard, which is incorporated herein in its entirety by this reference. The training phase involves setting gains, synchronizing clocks, synchronizing of symbol boundaries, and determination of weights associated with time or frequency domain equalization and echo cancellation. These are accomplished with a fixed set of data, also referred to as pilot tones, modulated on selected sub-channels. The pilot tones and the manner in which they are modulated are known to both sending and receiving modems. The channel analysis phase follows the training phase. During channel analysis phase each tone is modulated with varying amount of data in order to maximize the data carrying capability of the communication medium that links the modems. During this phase the modems pass parameters which allow each modem to establish a bit loading for each tone across a tone set. At the completion of the channel analysis and exchange the modems enter showtime state in which communication of voice, data, video, etc. across the communication medium begins.

FIG. 2 is an example diagram illustrating when messages are sent and data is processed by an xTU-C in the downstream direction 203 during initialization. In an embodiment, the xTU-C is a transmitter disposed in the DSLAM 102 of FIG. 1. At box 210, the xTU-C of the initializing line transmits an O-P-VECTOR 1 signal at the beginning of the channel discovery phase 205 in the downstream direction 203. The O-P-VECTOR 1 signal comprises a plurality of sync symbols modulated by a pilot sequence and which is aligned with sync symbols of vectored lines. The O-P-VECTOR 1 signal allows a vector control entity (VCE) to estimate FEXT that results from the initializing lines into the vectored lines.

Next, at box 220, the initializing xTU-C transmits an O-P-VECTOR 1-1 signal at the beginning of the training phase. The O-P-VECTOR 1-1 may be the same as O-P-VECTOR 1 and may allow the VCE to update the downstream FEXT channel estimates before transitioning into the training phase. At box 225, the xTU-C may transmit the O-P-VECTOR 2 signal after the training phase is complete. After transmitting the O-P VECTOR 2 signal, at box 230 the xTU-C may transmit O-P-VECTOR 2-1 signal, which comprises both sync symbols modulated by the pilot sequence and regular symbols. During the transmission of O-P-VECTOR 2-1, the VCE may estimate FEXT channels from all vectored lines into each initializing line and vice versa. At box 230, the xTU-C of the initializing line enters the channel analysis and exchange phase during which the xTU-C traditionally estimates the SNR and determines of the bit loading to be used during showtime after O-P-VECTOR 2-1 transmission is complete.

As shown in FIG. 2, the upstream direction 250 column shows an example of when messages are transmitted and data is processed by an xTU-R during initialization. In an embodiment, the xTU-R is a transmitter disposed in the CPE 104 of FIG. 1. In the upstream direction 250, the xTU-R of an initializing line starts transmitting an R-P-VECTOR 1 signal, at box 260, after detection of the O-SIGNATURE message in the channel discovery phase 265. The R-P-VECTOR 1 signal may have the same format as O-P-VECTOR 1. In an embodiment, the xTU-R is a receiver disposed in the CPE 105 of FIG. 1. During transmission of the R-P-VECTOR 1, the VCE estimates the FEXT channels from the initializing lines into all vectored lines. The VCE also enables the xTU-Cs of the vectored lines to cancel FEXT from the initializing lines during the remainder of initialization.

At box 270, the initializing xTU-R will transmit the R-P-VECTOR 1-1 signal at the beginning of the training phase. The initializing xTU-R, which may be the same as R-P-VECTOR 1, allows the VCE to update the upstream FEXT channel estimates from the initializing lines into the vectored lines, prior to transitioning into the training phase. The xTU-C then transmits the O-P-TRAINING V1 signal as a time fill signal while the xTU-R transmits R-P-VECTOR 1-1.

The initial value of timing advance is assigned by the xTU-C and is communicated in the O-SIGNATURE based on the provisional knowledge on the length of the line. If the timing advance is further re-adjusted during the training phase, then the FEXT channel estimate in the upstream direction 250 will be updated at the end of the training phase to account for any resulting change in the FEXT channel (signal R-P-VECTOR 1-2). The xTU-C then transmits the O-P-VECTOR 2 signal as a time fill signal while the xTU-R transmits R-P-VECTOR 1-2, at box 275.

At box 280, the xTU-R transmits R-P-VECTOR 2 at the end of the training phase. The R-P-VECTOR 2 may include sync symbols modulated by a pilot sequence and regular symbols. During the transmission of R-P-VECTOR 2, the VCE estimates the FEXT channels from all vectored lines into the initializing lines and vice versa. Finally, the whole FEXT channel matrix, including FEXT coefficients from the initializing lines into the vectored lines and FEXT coefficients from vectored lines into the initializing lines, are estimated by the VCE at the end of the R-P-VECTOR 2 transmission. At this point, the initialization process is complete and the initializing lines become active members of the vectored group. Therefore, after the R-P-VECTOR 2 transmission is complete, the VTU-R enters the channel analysis and exchange phase for estimation of the SNR and determination of the bit loading to be used during showtime.

As shown in FIG. 2, at the end of the training phase when the O-P-VECTOR 2-1 is transmitted and the R-P-VECTOR 2 is transmitted, the crosstalk noise on the join line is cancelled at box 290. At this point when the crosstalk is cancelled, the measured SNR in the channel analysis and exchange phase may be improved relative to an SNR measured earlier in the initialization phase. Specifically, when the FEXT is cancelled, a measured SNR in the channel analysis phase may be improved relative to the SNR measured before FEXT cancellation. This improved SNR may be higher than the SNR that complies with the maximum bit loading for each tone in a sync symbol, which may, for example, be 15 bits for a VDSL2. Traditionally, the redundant SNR may be decreased by setting smaller subcarrier gain adjustments during showtime. This subcarrier gain adjustment may result in transmit PSD of the join line being lower than the PSD used before FEXT cancellation. Situations in which the SNR is higher than the requisite SNR for maximal bit-loading may occur in DSL systems in which the loop is relatively short, e.g. shorter than 500 meters (m).

Traditionally, the redundant SNR that occurs as a result of crosstalk cancellation may be decreased, for example, by setting smaller subcarrier gain adjustments during showtime. As a result, the showtime PSD of a join line would be lower than the PSD used during the early initialization phase. The change in the PSD from the initialization phase to the showtime phase means that the total transmit power is reduced from the initialization phase to the showtime phase. In some cases, the receiver side programmable gain amplifier is set based on the higher power level from the initialization phase. In these cases, the analog-to-digital converter dynamic range may be wasted, resulting in potential overall performance degradation for a DSL system.

One embodiment of the present disclosure is directed to systems and methods for stabilizing the transmit power between the initialization phase and the showtime phase by using a same or substantially similar PSD in the initialization phase and the showtime phase. In such an embodiment, the PSD at the initialization phase, before crosstalk is cancelled (hereinafter referred to as crosstalk-free PSD), is adjusted by a processor (e.g., processor 1030 of FIG. 10) disposed at the DSLAM 102 of FIG. 1 or the CPE 104 of FIG. 1.

In one embodiment, a transmitter may be configured to move the power for certain tones from low frequency subcarriers to high frequency subcarriers. For example, in embodiments in which the DSL systems use short loops, the PSD may be adjusted from low frequency subcarriers to high frequency subcarriers. Adjusting the PSD in such a manner may facilitate achieving better performance in bit-loading for all subcarriers while transferring data at a higher data rate.

Figure 3:
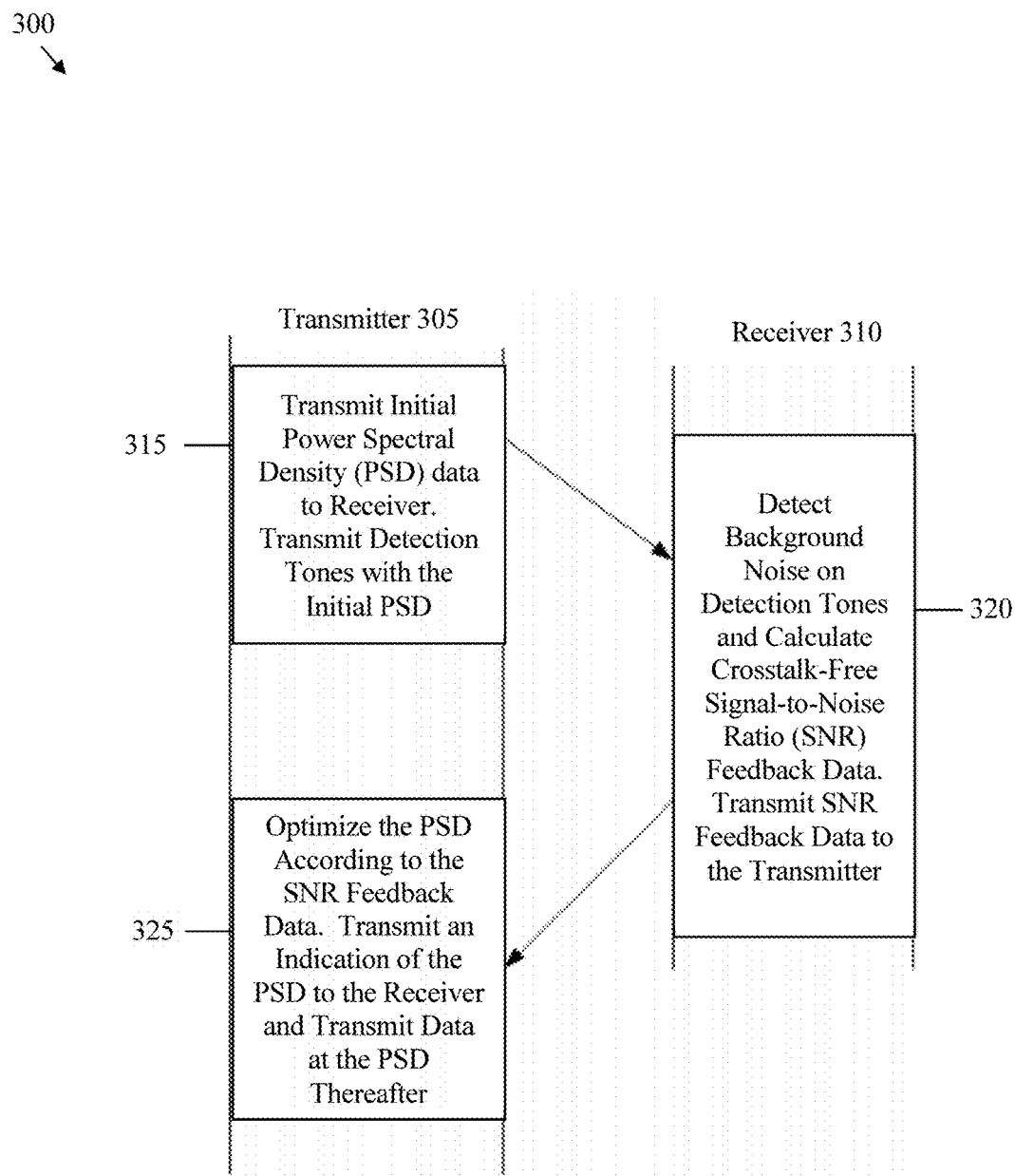
FIG. 3 is a message sequence diagram of an embodiment of a PSD optimization scheme.

FIG. 3 is a message sequence diagram 300 for one embodiment of a PSD optimization scheme. In particular, FIG. 3 illustrates a transmission procedure between a transmitter 305 and a receiver 310 to optimize a PSD by estimating the crosstalk-free PSD. In an embodiment, the message sequence diagram 300 is implemented during the channel discovery phase 205 and/or 265 of FIG. 2. In an embodiment, the transmitter 305 is a transmitter disposed in the DSLAM 102 of FIG. 1 and the receiver 310 is a receiver disposed in the CPE 104 of FIG. 1. In an embodiment, the transmitter 305 may be the same or similar to the transmitter unit 1040 of FIG. 10 and the receiver 310 may be the same or similar to the receiver unit 1020 of FIG. 10. To this end, the transmitter 305 and the receiver 310 may be operably coupled to and/or include processors (e.g., the processor 1030 in FIG. 10) that facilitate performing the actions and steps described herein. As an illustrative example, the transmitter 305 and/or the receiver 310 may be either the xTU-C or the xTU-R. In some embodiments, the transmitter 305 and/or the receiver 310 may be a DSLAM transceiver coupled to a processor and positioned at either a CO or a CPE 104 of a DSL system (e.g., the DSL system 100 of FIG. 1).

At step 315, the transmitter 305 may allocate one or more tones in a sync symbol to be detection tones. Tones may refer to subcarriers of a sync symbol. The detection tones may be subcarriers corresponding to quiet signals. A quiet signal may refer to a muted signal or a signal in which no data is sent. According to the ITU-T G.993.5 standard, all subcarriers or tones with an index equal to $10n$, $10n+2$, $10n+3$, $10n+4$, $10n+5$, $10n+6$, $10n+8$ or $10n+9$, with n being an integer value, are probe tones. According to some embodiments, the transmitter 305 may allocate or redefine at least a subset of these probe tones as the detection tones. For example, the subcarriers for $10n+3$, $10n+5$ and $10n+9$ may be redefined by the transmitter 305 to be the detection tones. At step 315, the transmitter 305 may transmit at least one sync symbol with one or more of the detection tones to the receiver 310 before crosstalk has been cancelled (e.g., the box 290 of FIG. 2).

At step 315, the transmitter 305 may also transmit a signal or message with an initial PSD to the receiver before crosstalk has been cancelled. The initial PSD may refer to the PSD from the initialization phase that is traditionally higher than the PSD during the showtime phase. The change in the PSD during the two phases may occur as a result of noise cancellation. In some embodiments, the detection tones may be sent in sync symbols during both the initialization phase and the showtime phase.

At step 320, the receiver 310 may utilize the quiet signal sent on the detection tones to detect background noise on the detection tones. Since no signal is being sent on the detection tones, the receiver 310 may be able to measure a true background noise that occurs on the detection tones. In this way, background noise may refer to the detected signals that are not from subscriber lines. For example, the background noise detected during the detection tones may include unsolicited commercial or network control messages, misconfigured hardware, leaks from other systems, malicious activities, and/or other signals received from unintended sources. Therefore, the receiver 310 may use the detection tones to detect true background noise. In one embodiment, the background noise estimates on the detection tones could be extrapolated to all tones so that an optimized PSD can be calculated and accordingly adjusted for all of the tones.

At step 320, the receiver 310 may also be configured to estimate the crosstalk-free SNR-related information (also referred to herein as crosstalk-free feedback data). For example, the receiver 310 may be configured to estimate or compute the crosstalk-free SNR, an error sample, a quiet line noise measurement (QLN), etc. For example, the crosstalk-free SNR could be estimated based on the received initial PSD and the estimated background noise. The receiver 310 may transmit, at step 320, the crosstalk-free SNR related information to the transmitter 305.

At step 325, the PSD is optimized according to the crosstalk-free SNR related information received from the receiver 310. Using the crosstalk-free SNR related information, the transmitter 305 may estimate an optimized PSD for each of the tones. Once the optimized PSD has been estimated, the transmitter 305 may adjust the PSD to match the optimized PSD to get a more efficient bit-loading for all tones. In various embodiments, the crosstalk-free SNR estimates may have been calculated or estimated by transmitter 305 and/or the receiver 310.

According to some embodiments, the transmitter 305 may be configured to adjust the power level of each tone to be the same or similar to the optimized PSD. In contrast, the current standard, ITU-T G.993.5, requires the receiver 310 to send back a single PSD ceiling value. In particular, the ITU-T G.993.5 standard requires the receiver 310 to send back a single PSD ceiling value in an R-UPDATE message. The transmitter 305 then uses the PSD ceiling value to shape the PSD value for all tones to be equal to the PSD ceiling value.

According to ITU-T G.993.5 standard, the PSD ceiling is determined by the receiver 310 and sent back to the transmitter 305. Once the transmitter 305 receives the PSD ceiling from the receiver 310, the transmitter 305 is traditionally configured to set the PSD in all bands to the same value of the PSD ceiling. However, the PSD ceiling does not take into account short loops or high SNRs that result from crosstalk cancellation. Therefore, embodiments of the present disclosure do not use a PSD ceiling in adjusting the PSD for tones.

Figure 4:
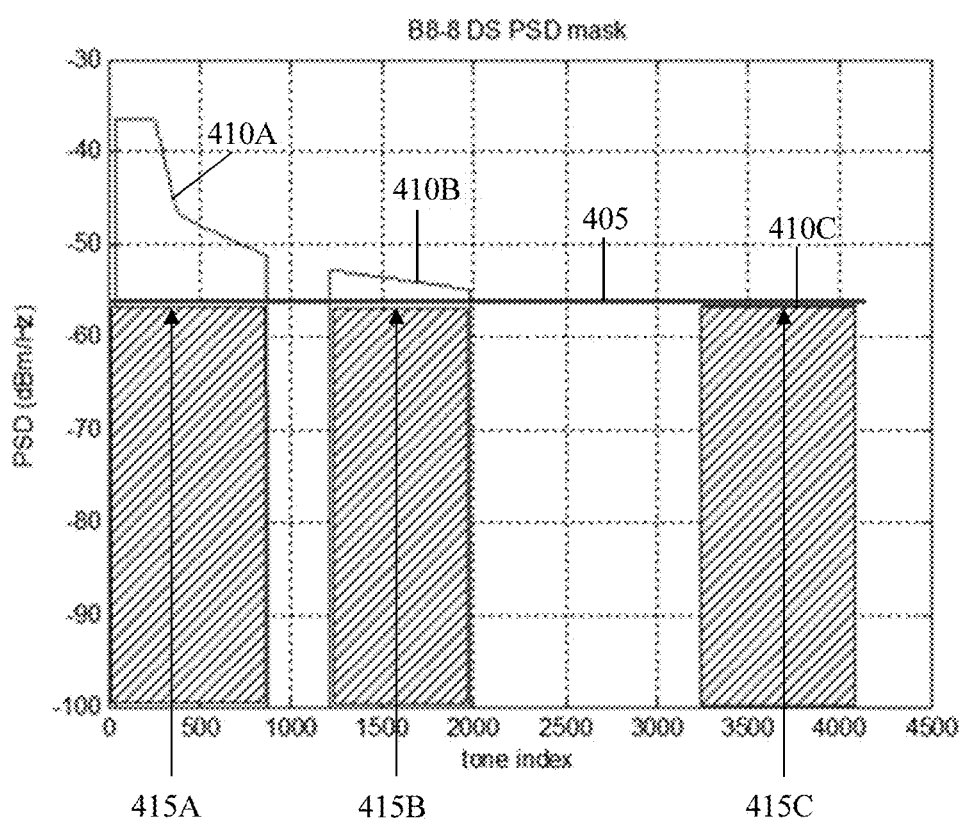
FIG. 4 is a graph showing an example of applying the standard PSD adjustment schemes using a PSD ceiling.

FIG. 4 is a graph 400 illustrating an example of applying the PSD ceiling value of the ITU-T G.993.5 standard to the transmission PSD for all tones. In one embodiment, the transmitter (e.g., the transmitter 305 of FIG. 3) may be configured to allocate power to a different location in a power spectrum for all tones to optimize data throughput. An example PSD ceiling value according to the ITU-T G.993.5 standard is shown in FIG. 4 as the solid line 405. The lines 410A, 410B, and 410C show the PSD mask values for each of the tones. The PSD mask lines 410A, 410B, and 410C show the legal power limit for each tone shown in the graph 400. The lines 415A, 415B, and 415C show the PSD values set by the transmitter in response to receiving the PSD ceiling value, line 405, from the receiver.

As shown in FIG. 4, the lines 415A, 415B, and 415C, corresponding to the PSD values for each of the tones, are each set to the same PSD value of the PSD ceiling. Therefore, traditionally, transmitters may be configured to automatically define the PSD for each tone to be the PSD ceiling, regardless of whether that PSD ceiling value will optimize data throughput for the system. However, embodiments of the present disclosure are directed to adjusting the PSD, or power, for each tone in a spectrum based on crosstalk-free feedback data to optimize data throughput. As shown in FIG. 4, the PSD mask line 410C may line up with the PSD ceiling value line 405. Regardless of the PSD ceiling value received from the receiver, the PSD value for each of the tones may not exceed the PSD mask value for each of the tones. In practice, a flat PSD ceiling may not provide the best performance for short loop DSL systems.

Figure 5:
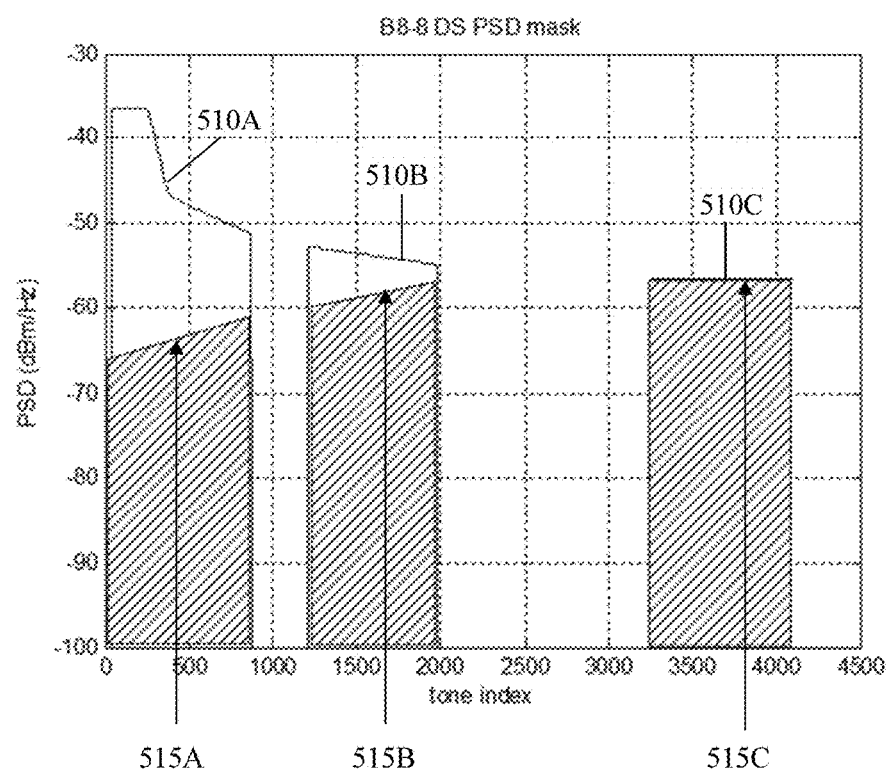
FIG. 5 is a graph showing an example of applying the embodiment of a PSD optimization scheme of FIG. 3.

FIG. 5 is a graph 500 illustrating an example of applying the PSD optimization scheme 300 described in FIG. 3. Similar to PSD mask lines 410A, 410B, and 410C shown in FIG. 4, the PSD mask lines 510A, 510B, and 510C illustrate the PSD mask for each tone and remain the same for each tone. However, the embodiments disclosed herein either disregard the PSD ceiling value or do not receive a PSD ceiling value from a receiver (e.g., the receiver 310 of FIG. 3). Therefore, the PSD ceiling value is not present in graph 500 showing the PSD optimization schemes disclosed herein.

Instead, as shown in graph 500 of FIG. 5, lines 515A and 515B illustrate that the transmission PSD is adjusted to be lower at lower tones, or lower frequency bands, and higher at higher tones, or higher frequency bands. In this way, line 515A shows a slight rise in PSD as the tone index increases. A similar direct relationship is displayed in line 515B. Note that the adjusted PSD values for line 515A and 515B are all below the corresponding PSD mask values shown by lines 510A and 510B, respectively. In contrast, line 515C and 510C line up to match values because the PSD mask values depicted by line 510C sets the maximum upper limit for the PSD value for each tone. Therefore, in one embodiment, the transmitter may not be permitted to adjust the PSD for a tone or frequency to exceed the corresponding PSD mask value.

Figure 6:
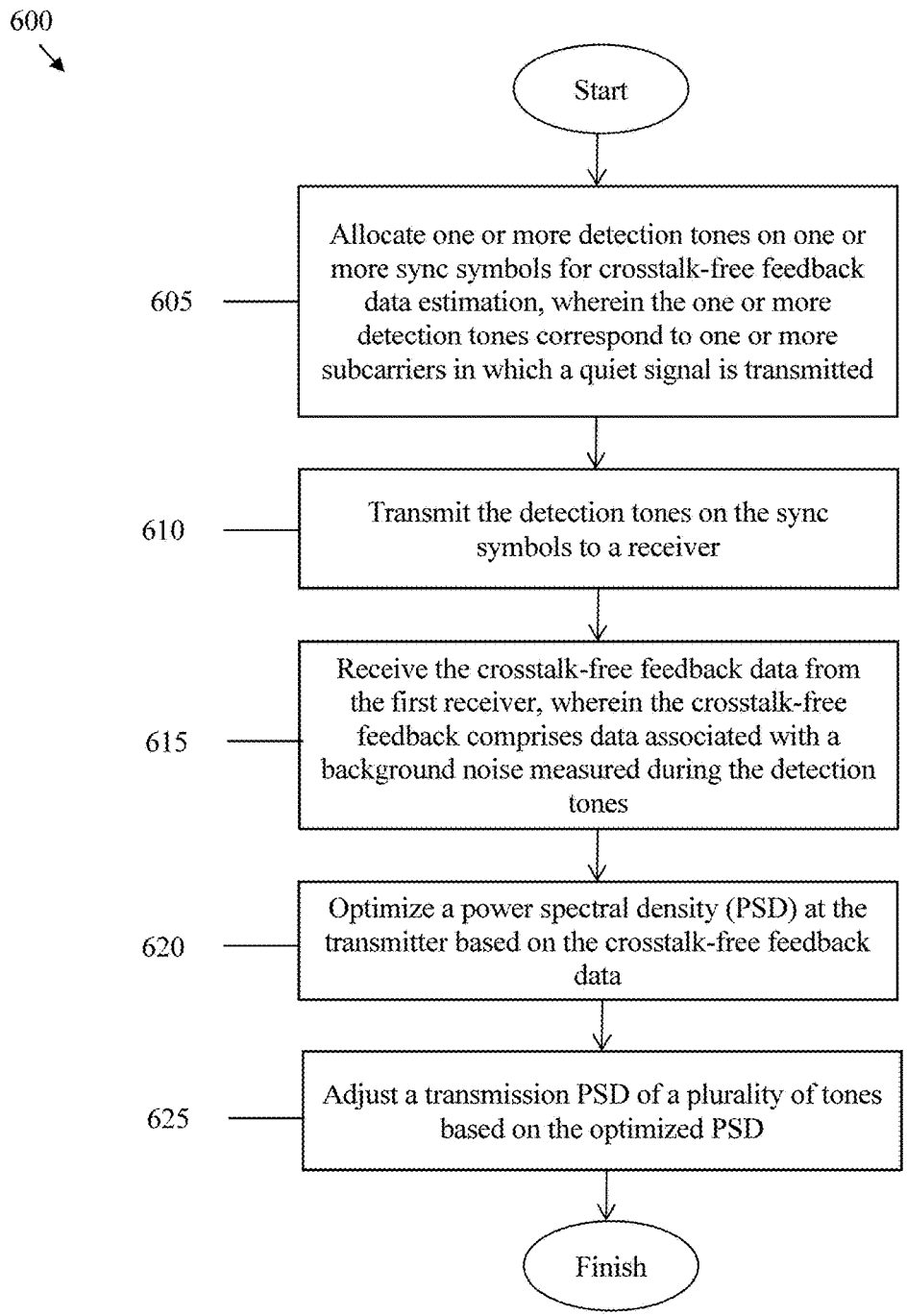
FIGS. 6 and 7 are flowcharts of an embodiment of a PSD optimization scheme.

FIG. 6 is a flowchart of an embodiment of a method 600 of PSD optimization performed by a transmitter (e.g, the transmitter 305 of FIG. 3). In one embodiment, the transmitter may be disposed at the DSLAM 102 of FIG. 1. Alternatively, the transmitter may be disposed at the CPE 104 of FIG. 1. In one embodiment, at least a portion of the steps shown in method 600 may be executed during the channel discovery phase 205 and/or 265 of FIG. 2. In an embodiment, the steps shown in method 600 may be performed, for example, prior to noise cancellation being performed on a join line (e.g., the box 290 of FIG. 2). The transmitter may include and/or be coupled to one or more processors (e.g., the processor 1030 of FIG. 10) that facilitate performing the steps depicted in the method 600 of FIG. 6. The method 600 of FIG. 6 depicts an example of at least a portion of the steps performed by the transmitter in optimizing PSDs in an embodiment of the PSD optimization method.

In block 605, the transmitter may allocate one or more detection tones on one or more sync symbols for crosstalk-free feedback data estimation. For example, the probe tones for 10n+3, 10n+5 and 10n+9 of a sync symbol may be redefined by the transmitter to be detection tones on one or more sync symbols to be transmitted to a receiver (e.g., the receiver 310 of FIG. 3). In this way, the transmitter may be configured to manually or automatically define the detection tones in the sync symbols before transmission. The one or more detection tones may correspond to one or more subcarriers in which a quiet signal is transmitted. The quiet signal may be, for example, a muted signal or a signal in which no data is sent.

At block 610, the transmitter may transmit the detection tones on the sync symbols to the receiver 305. In one embodiment, the transmitter may also transmit a message with an initial PSD to the receiver prior to crosstalk cancellation. Once the receiver has used the detection tones and the initial PSD to determine a true background noise on the detection tones and other SNR related crosstalk-free feedback data, the transmitter may receive an estimate of the background noise and/or the SNR related crosstalk-free feedback data at block 615. The crosstalk-free feedback data may include data associated with the background noise measured by the receiver during the detection tones. For example, the SNR related crosstalk-free feedback data may include crosstalk-free SNR, an error sample, a quiet line noise measurement, etc.

At block 620, the transmitter may optimize a PSD for each of the tones based on the received crosstalk-free feedback data. In one embodiment, the transmitter may be configured to ignore the PSD ceiling value that the receiver sent to the transmitter according to the ITU-T G.993.5 standard. In another embodiment, the transmitter may not receive the PSD ceiling value from the receiver. In this embodiment, the receiver may not be configured to calculate and/or transmit the PSD ceiling value to the transmitter.

According to some embodiments, the transmitter may determine which PSD value for each tone will optimize the performance, i.e., maximize the bit rate and data rate for each tone using the crosstalk-free feedback data. The transmitter may then adjust a transmission PSD of a plurality of tones based on the optimized PSD, at block 625. For example, the transmitter may set the PSD for each tone to be equivalent to the initial PSD value sent by the transmitter earlier in the initialization phase. As another illustrative example, the transmitter may set a lower PSD for lower tones, or lower frequency bands, and set a higher PSD for higher tones, or higher frequency bands. In one embodiment, the transmitter may be configured to determine whether the DSL system uses a short loop. If the transmitter determined that the DSL system uses a short loop, the transmitter may be configured to move some of the power from low frequency subcarriers to high frequency subcarriers initially. Such a power adjustment may result in better bit-loading for all the subcarriers, thereby resulting in a higher data rate. Therefore, the transmitter may be configured to allocate power for each tone to a different location in a spectrum to optimize data throughput.

Figure 7:
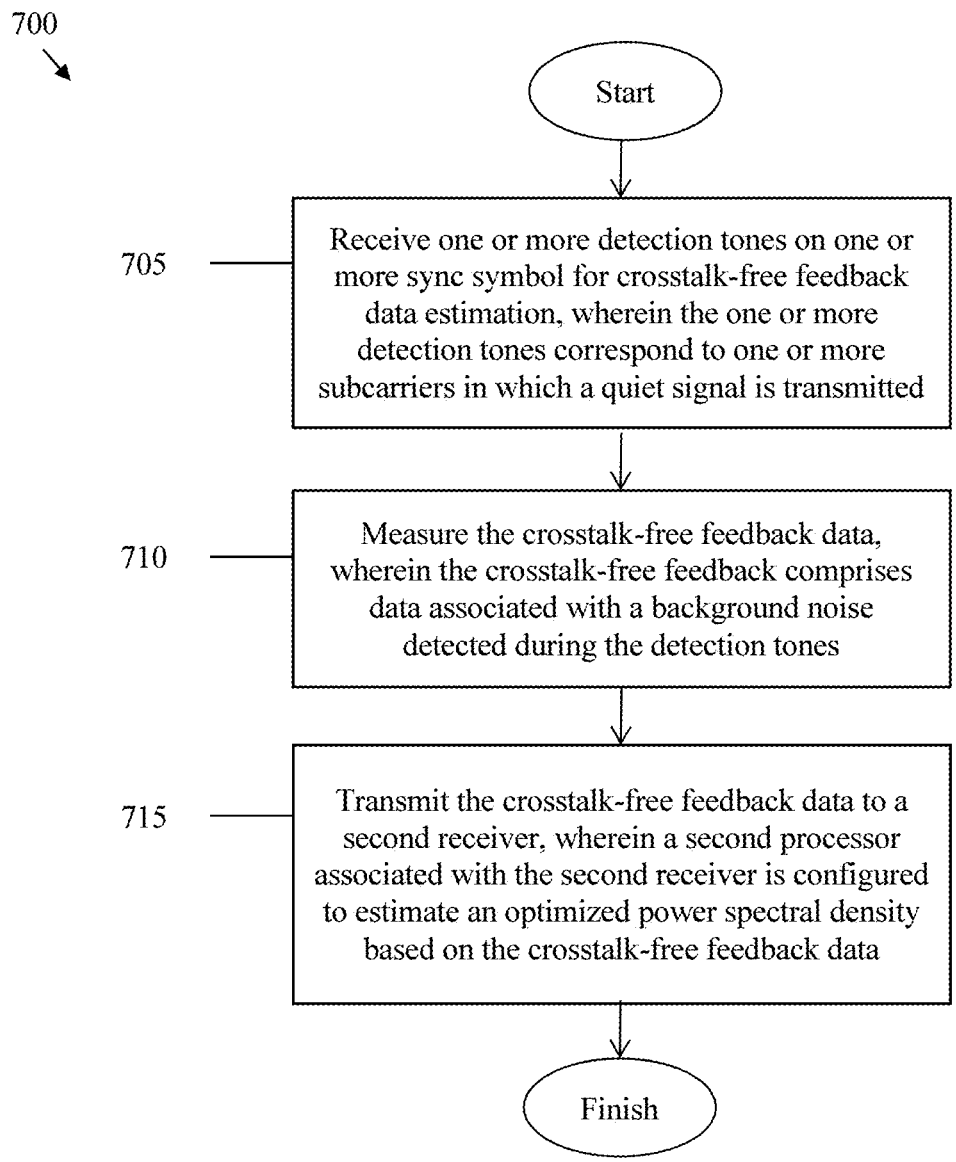

FIG. 7 is a flowchart of an embodiment of a method 700 of PSD optimization performed by a receiver (e.g., the receiver 310 of FIG. 3). In one embodiment, the receiver may be disposed at the DSLAM 102 of FIG. 1. Alternatively, the receiver may be disposed at the CPE 104 of FIG. 1. In one embodiment, at least a portion of the steps shown in method 700 may be executed during the channel discovery phase 205 and/or 265 of FIG. 2. In an embodiment, the steps shown in method 700 may be performed, for example, prior to noise cancellation being performed on a join line (e.g., the box 290 of FIG. 2). In one embodiment, at least a portion of the steps shown in method 700 may be performed during the channel discovery phase 205 and/or 265 of FIG. 2. The receiver may include and/or be coupled to one or more processors (e.g., the processor 1030 of FIG. 10) that facilitate performing the steps depicted in the method 700 of FIG. 7. The method 700 of FIG. 7 depicts an example of at least a portion of the steps performed by the receiver in generating feedback data in an embodiment of the PSD optimization method.

At block 705, the receiver may receive one or more detection tones on a sync symbol for crosstalk-free feedback data estimation. The detection tones may correspond to subcarriers in which a quiet signal is transmitted. The quiet signal, or muted signal, may be a signal in which no data from a subscriber line is sent. In this way, the detection tones only include signals that can be characterized as background noise.

At block 710, the receiver may measure the crosstalk-free feedback data associated with the background noise detected during the detection tones. For example, a processor of the receiver may measure a SNR of the background noise detected on the detection tones. In embodiments in which this measurement is performed before crosstalk is cancelled, the SNR measured during the detection tones may reflect the crosstalk-free SNR. The receiver may also be configured to compute other SNR related information, such as, for example, the crosstalk-free SNR, an error sample, a quiet line noise measurement. In one embodiment, the receiver may receive a signal from a transmitter (e.g., the transmitter 305 of FIG. 3) with an initial PSD reflecting the PSD during the early initialization phase. The receiver may use the initial PSD and a measured value of the background noise to determine the crosstalk-free SNR. At block 715, the receiver may transmit the crosstalk-free feedback data to the transmitter. A processor coupled to the transmitter may compute an optimized PSD for each of the tones and then adjust PSD accordingly for the tones using the crosstalk-free SNR related information.

Figure 8:
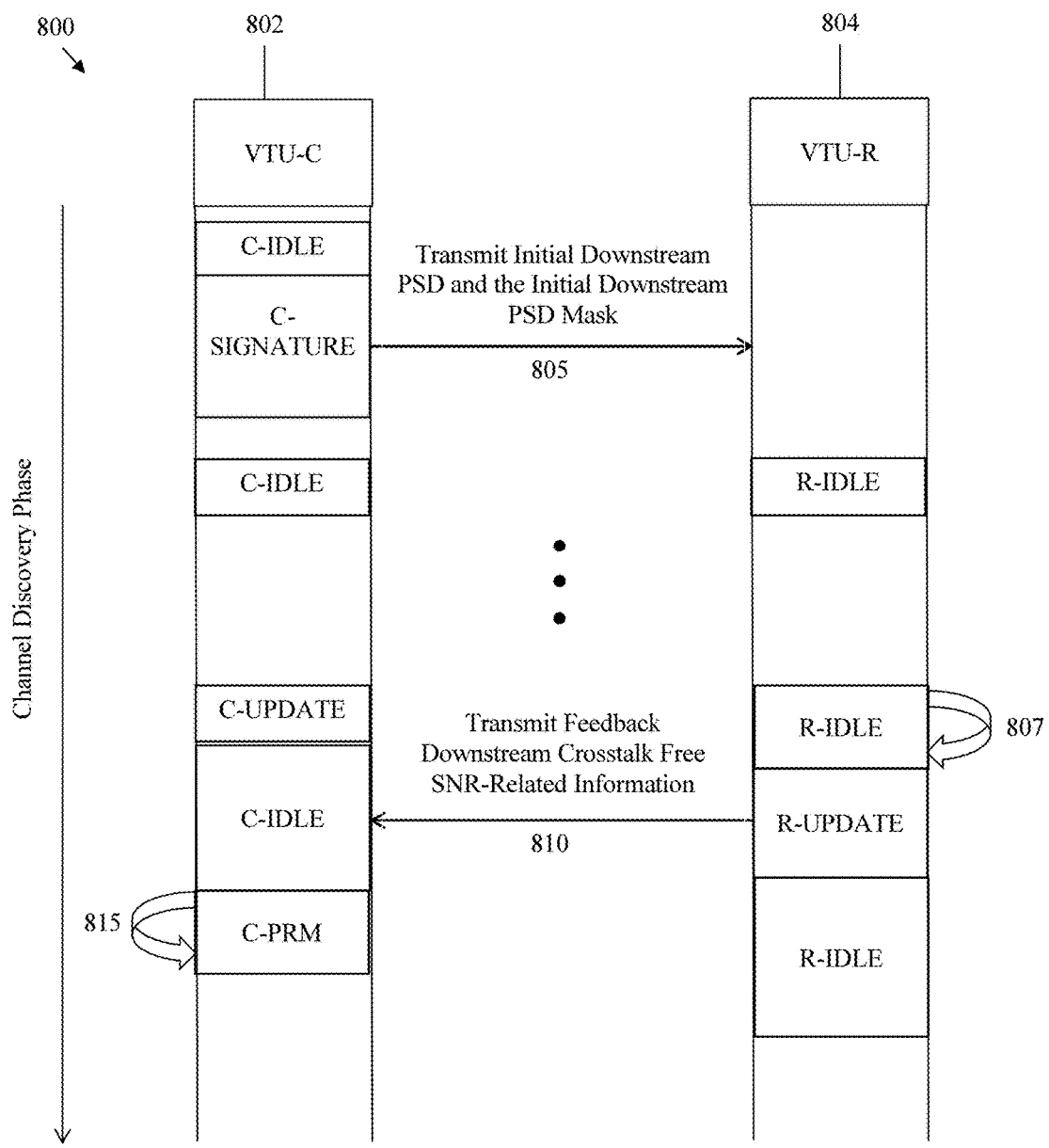
FIGS. 8 and 9 are message sequence diagrams of various embodiments of a PSD optimization scheme.

FIG. 8 illustrates an example message sequence diagram 800 performed during the channel discovery phase (e.g., the discovery phase 205 and/or 260 of FIG. 2) according to the systems and methods for PSD optimization disclosed herein. The diagram 800 illustrates the timings of messages exchanged between the transmitter 802 and the receiver 804. The transmitter 802 and the receiver 804 may be the same or similar to the transmitter 305 and receiver 310 of FIG. 3, respectively. In an embodiment, the transmitter 802, or the VTU-C, is disposed at an operator end (e.g., the DSLAM 102 of FIG. 1) of a DSL system (e.g., the DSL system 100 of FIG. 1), and the receiver 804, or the VTU-R, is disposed at a customer end (e.g., the CPE 104 of FIG. 1) of the DSL system. In the example shown in FIG. 8, a VTU-C is the transmitter 802 and VTU-R is the receiver 804, but the same principles may apply between any other type of xTU-C and/or xTU-R. The diagram 800 also illustrates that according to one embodiment, the downstream background noise is detected on the detection tones during the channel discovery phase 205 of FIG. 2.

At step 805, the VTU-C transmits the initial downstream PSD and the initial downstream PSD mask in a C-SIGNATURE message to the VTU-R. The VTU-R receives the initial downstream PSD, the initial downstream PSD mask, and the detection tones and then calculates the downstream crosstalk-free SNR related information, such as the SNR, error sample, or quiet line noise, at step 807 during an R-IDLE phase. At step 810, the downstream crosstalk-free SNR related information is transmitted back to the VTU-C in an R-UPDATE message. At step 815, the downstream PSD may be optimized according to the downstream crosstalk-free SNR related information during a C-PRM phase. In one embodiment, the VTU-C may transmit an indication of the optimized PSD back to the VTU-R.

Figure 9:
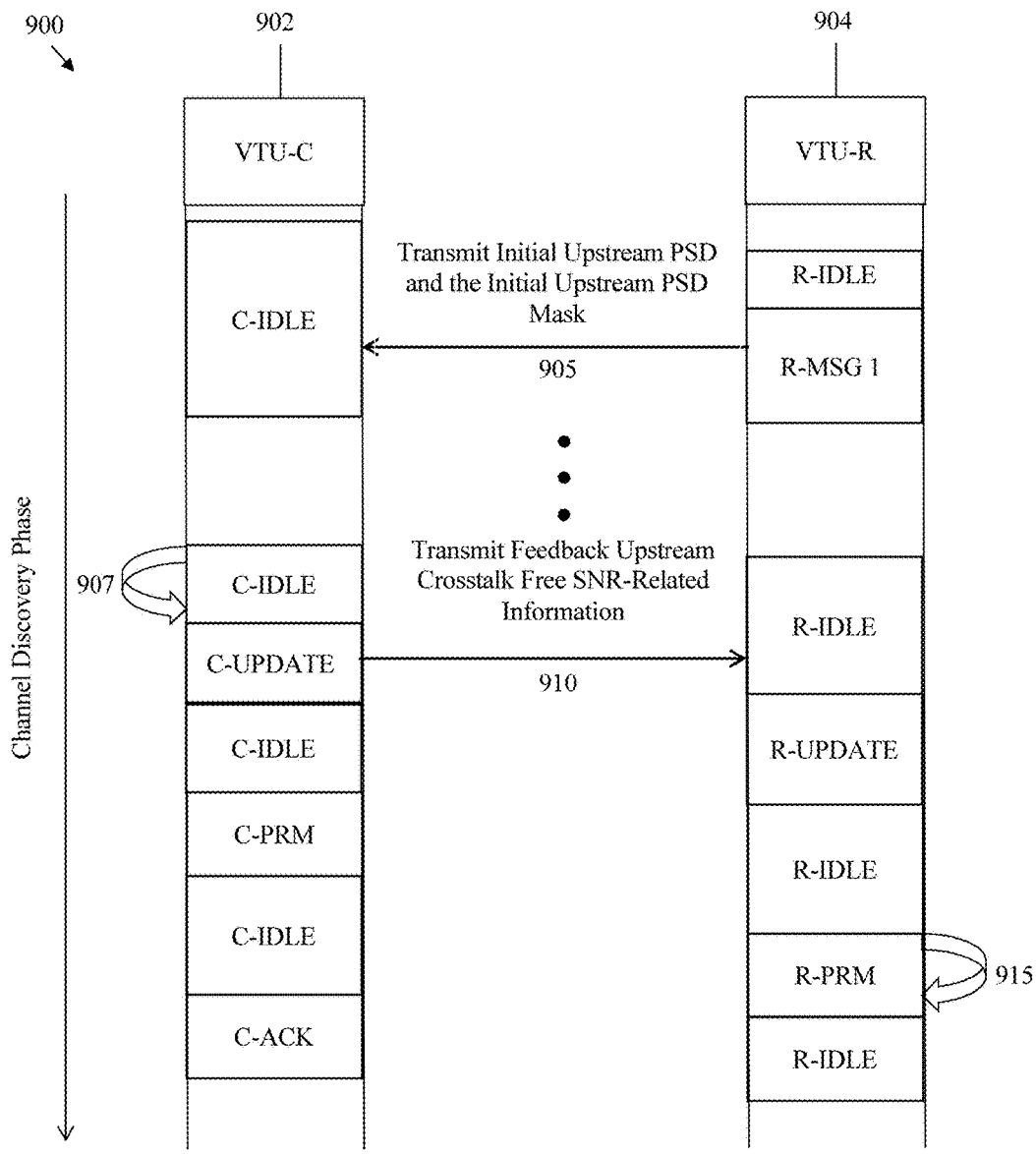

FIG. 9 illustrates an example message sequence diagram 900 performed in the channel discovery phase according to the systems and methods for PSD optimization disclosed herein. The message sequence diagram 900 is similar to the message sequence diagram 800 shown in FIG. 8, except that in diagram 900, the upstream background noise is detected on the detection tones during the channel discovery phase 205 or 265 of FIG. 2. Similar to diagram 800 in FIG. 8, the transmitter 902 is a VTU-C that may be disposed at an operator end (e.g., the DSLAM 102 of FIG. 1) of a DSL system (e.g., the DSL system 100 of FIG. 1), and the receiver 904 is a VTU-R that may be disposed at a customer end (e.g., the CPE 104 of FIG. 1) of the DSL system. The transmitter 902 and the receiver 904 may be the same or similar to the receiver 310 and the transmitter 305 of FIG. 3, respectively. Notably, the same principles may apply between any other type of xTU-C and/or xTU-R.

As shown in FIG. 9, the PSD optimization methods and systems disclosed herein may be performed during the channel discovery phase 205 and/or 265 of FIG. 2 in one embodiment. However, the PSD optimization methods and systems disclosed herein may also be performed during other phases or time periods such as, for example, the showtime phase. At step 905, the VTU-R transmits the initial upstream PSD and the initial upstream PSD mask for the tones in R-MSG 1. The VTU-C receives the initial upstream PSD, the initial upstream PSD mask, and the detection tones and then calculates the upstream crosstalk-free SNR related information, such as the SNR, error sample, or quiet line noise at step 907 in the C-IDLE phase. At step 910, the VTU-R transmits the upstream crosstalk-free SNR related information to the VTU-R in a C-UPDATE message. At step 915, the VTU-R optimizes the upstream PSD based on the upstream crosstalk-free SNR related information in the R-PRM phase. In one embodiment, the VTU-R may transmit an indication of the optimized PSD back to the VTU-C.

Examples of simulation results of the PSD optimization systems and methods disclosed herein are depicted in Table 1 and Table 2. However, the following examples are merely exemplary, and are not intended to limit the embodiments of the present disclosure to this specific implementation manner. A Deutsche Telekom PE 0.4 millimeter (mm) cable was used, with a loop length of 200 meters. The net data rate (NDR) and the actual transmitted power (ATP) of downstream and upstream were compared for the two systems: one uses the PSD ceiling method; the other uses an embodiment of the PSD optimization scheme disclosed herein.

In particular, Table 1 below shows the results when profile 8b B8-4 is used. By using an embodiment of the PSD optimization method, the downstream NDR is increased by 7.3 Megabits per second (Mbps) and the downstream ATP is decreased by 12.8 decibels-milliWatt (dBm).

TABLE 1

| Performance when profile 8b B8-4 is used | | | | | | | |
| --- | --- | --- | --- | --- | --- | --- | --- |
| PSD CEILING METHOD | | | | PROPOSED METHOD | | | |
| DS | | US | | DS | | US | |
| NDR (Mbps) | ATP (dBm) | NDR (Mbps) | ATP (dBm) | NDR (Mbps) | ATP (dBm) | NDR (Mbps) | ATP (dBm) |
| 87.7 | 18.5 | 20 | 6.2 | 95 | 5.7 | 19 | −5 |

Table 2 shows the results when profile 17a B8-8 is used. By using an embodiment of the PSD optimization method, the downstream NDR is increased by 7.5 Mbps and the downstream ATP is decreased by 3 dBm.

TABLE 2

| Performance when profile 17a B8-8 is used | | | | | | | |
| --- | --- | --- | --- | --- | --- | --- | --- |
| PSD CEILING | | | | PROPOSED METHOD | | | |
| DS | | US | | DS | | US | |
| NDR (Mbps) | ATP (dBm) | NDR (Mbps) | ATP (dBm) | NDR (Mbps) | ATP (dBm) | NDR (Mbps) | ATP (dBm) |
| 130.5 | 14.5 | 87.5 | 10.3 | 138 | 11.5 | 90.8 | 8.8 |

Figure 10:
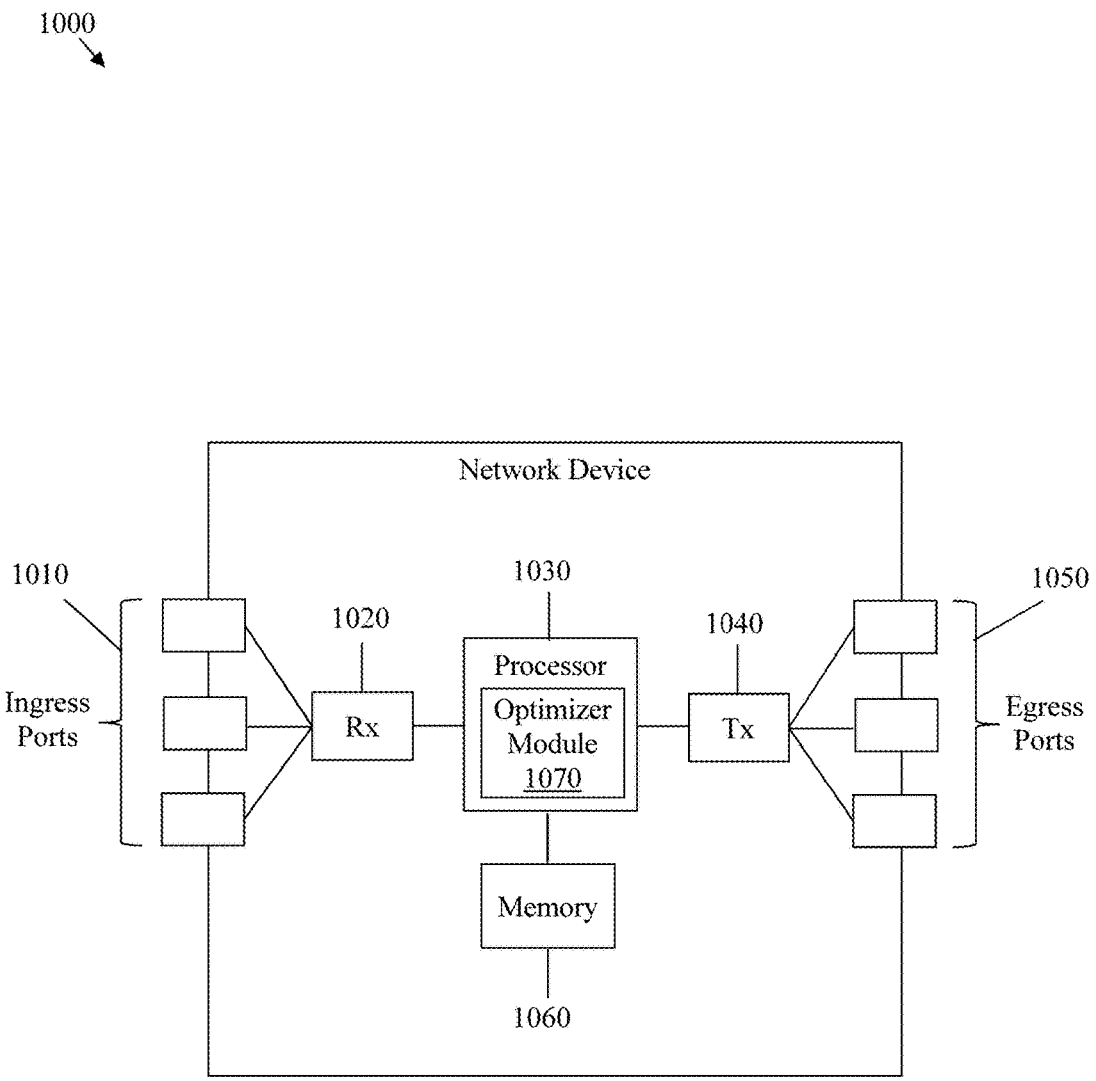
FIG. 10 is a schematic diagram of a network device according to an embodiment of the disclosure.

FIG. 10 is a schematic diagram of a network device 1000 according to an embodiment of the disclosure. The network device 1000 is suitable for implementing the disclosed embodiments, including the message sequence diagrams 300, 800, and 900 and the methods 600 and 700. The network device 1000 comprises ingress ports 1010 and receiver units (Rx) 1020 for receiving data; a processor, logic unit, or central processing unit (CPU) 1030 to process the data; transmitter units (Tx) 1040 and egress ports 1050 for transmitting the data; and a memory 1060 for storing the data. The network device 1000 may also comprise optical-to-electrical (OE) components and electrical-to-optical (EO) components coupled to the ingress ports 1010, receiver units 1020, transmitter units 1040, and egress ports 1050 for egress or ingress of optical or electrical signals.

The processor 1030 may be implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the ingress ports 1010, receiver units 1020, transmitter units 1040, egress ports 1050, and memory 1060. The processor 1030 comprises an optimizer module 1070. The optimizer module 1070 performs at least part of the message sequence diagrams 300, 800, and 900 and the methods 600 and 700. The inclusion of the optimizer module 1070 therefore provides an improvement to the functionality of the device 1000. The optimizer module 1070 also effects a transformation of the device 1000 to a different state. Alternatively, the optimizer module 1070 is implemented as instructions stored in the memory 1060 and executed by the processor 1030.

The memory 1060 comprises one or more disks, tape drives, and solid-state drives and may be used as an over-flow data storage device, to store programs when such programs are selected for execution, and to store instructions and data that are read during program execution. The memory 1060 may be volatile and non-volatile and may be read-only memory (ROM), random-access memory (RAM), ternary content-addressable memory (TCAM), and static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    a processor configured to define one or more detection tones in a sync symbol for crosstalk-free feedback data estimation, wherein the one or more detection tones are portions of the sync symbol being transmitted that are empty of data;
    a transmitter operably coupled to the processor and configured to transmit the sync symbol having the one or more detection tones to a computing device; and
    a receiver operably coupled to the processor and configured to receive crosstalk-free feedback data from the computing device, wherein the crosstalk-free feedback data comprises data associated with a background noise detected during the one or more detection tones,
    wherein the processor is further configured to estimate an optimized power spectral density (PSD) used by the transmitter to transmit a plurality of tones to the computing device, and
    wherein the optimized PSD is based at least in part on the crosstalk-free feedback data.

2. The apparatus of claim 1, wherein the crosstalk-free feedback data comprises at least one of a background noise measurement, a signal to noise ratio (SNR), an error sample, or a quiet line noise (QLN) measurement.

3. The apparatus of claim 1, wherein the processor is further configured to define a plurality of subcarrier probe tones with an index equal to 10n+3, 10n+5, and 10n+9 as the one or more detection tones, and wherein n comprises an integer.

4. The apparatus of claim 1, wherein the processor is further configured to adjust a transmission PSD for each tone of the plurality of tones based at least in part on the optimized PSD.

5. The apparatus of claim 1, wherein the processor is further configured to extrapolate an estimation of the background noise to each tone of the plurality of tones.

6. The apparatus of claim 1, wherein the computing device is configured to determine a crosstalk-free PSD corresponding to a PSD prior to cancelling crosstalk on a join line.

7. The apparatus of claim 1, wherein the processor is configured to allocate power to a different location in a spectrum for each tone of the plurality of tones to optimize data throughput.

8. An apparatus comprising:
    a receiver configured to receive one or more detection tones of a sync symbol for crosstalk-free feedback data estimation from a computing device, wherein the one or more detection tones are portions of the sync symbol being transmitted that are empty of data;
    a processor operably coupled to the receiver and configured to measure the crosstalk-free feedback data, wherein the crosstalk-free feedback data comprises data associated with a background noise detected during the one or more detection tones; and
    a transmitter operably coupled to the processor and configured to transmit the crosstalk-free feedback data to the computing device, wherein the computing device is configured to estimate an optimized power spectral density (PSD) based on the crosstalk-free feedback data.

9. The apparatus of claim 8, wherein the crosstalk-free feedback data comprises at least one of a background noise measurement, a signal to noise ratio (SNR), an error sample, or a quiet line noise (QLN) measurement.

10. The apparatus of claim 8, wherein a transmission PSD is adjusted from lower frequency subcarriers to higher frequency subcarriers for short loop lengths.

11. The apparatus of claim 8, wherein the receiver is further configured to receive a message associated with an initial PSD from the computing device.

12. The apparatus of claim 8, wherein a transmission PSD for each subsequent tone to be transmitted is adjusted in response to determining that the apparatus operates over a short loop length.

13. A method comprising:
    allocating one or more detection tones of a sync symbol for crosstalk-free feedback data estimation, wherein the one or more detection tones are portions of the sync symbol being transmitted that are empty of data;
    transmitting the sync symbol having the one or more detection tones to a computing device;
    receiving the crosstalk-free feedback data from the computing device, wherein the crosstalk-free feedback data comprises data associated with a background noise detected during the one or more detection tones;
    determining an optimized power spectral density (PSD) based at least in part on the crosstalk-free feedback data; and
    adjusting a transmission PSD of a plurality of tones based at least in part on the optimized PSD.

14. The method of claim 13, wherein the transmission PSD of each tone of the plurality of tones is adjusted to be the optimized PSD.

15. The method of claim 14, wherein the transmission PSD for each tone of the plurality of tones is adjusted dynamically to a different location in a spectrum to optimize data throughput.

16. The method of claim 14, wherein the transmission PSD for each tone of the plurality of tones is adjusted in response to ignoring a PSD ceiling received from the computing device.

17. The method of claim 13, wherein the background noise excludes crosstalk noise.

18. The method of claim 13, wherein the crosstalk-free feedback data comprises at least one of a background noise measurement, a signal to noise ratio (SNR), an error sample, or a quiet line noise (QLN) measurement.

19. The method of claim 13, wherein the transmission PSD for the plurality of tones is adjusted in response to determining that the computing device operates over a short loop length, and wherein the PSD is adjusted to be higher for higher frequency bands.

* * * * *

UNITED STATES PATENT AND TRADEMARK OFFICE
CERTIFICATE OF CORRECTION

PATENT NO. : 9,985,685 B2
APPLICATION NO. : 14/861467
DATED : May 29, 2018
INVENTOR(S) : Hui Yin et al.

Page 1 of 1

It is certified that error appears in the above-identified patent and that said Letters Patent is hereby corrected as shown below:

On the Title Page

(72) Inventors: should read as:
Hui Yin, Shenzhen (CN); Zhong Pan, Shenzhen (CN);
Jianping Tu, Shenzhen (CN); Haixiang Liang, Atherton, CA (US)

Signed and Sealed this
Twenty-fourth Day of July, 2018

Andrei Iancu
*Director of the United States Patent and Trademark Office*